United States Patent [19]

Imai

[11] Patent Number: 4,506,958
[45] Date of Patent: Mar. 26, 1985

[54] COMPACT ZOOM LENS SYSTEM

[75] Inventor: Toshihiro Imai, Hachiooji, Japan

[73] Assignee: Olympus Optical Co., Ltd., Tokyo, Japan

[21] Appl. No.: 442,414

[22] Filed: Nov. 17, 1982

[30] Foreign Application Priority Data

Nov. 24, 1981 [JP] Japan .................. 56-186871

[51] Int. Cl.³ ............................................. G02B 7/04
[52] U.S. Cl. ..................................... 350/427; 350/423
[58] Field of Search ............... 350/423, 427, 475, 449, 350/450, 428, 430, 426

[56] References Cited

U.S. PATENT DOCUMENTS

| | | | |
|---|---|---|---|
| 2,908,199 | 10/1959 | Kaprelian | 350/423 |
| 4,232,942 | 11/1980 | Ikemori | 350/423 |
| 4,240,700 | 12/1980 | Ogawa et al. | |
| 4,299,454 | 11/1981 | Betensky | 350/450 |

FOREIGN PATENT DOCUMENTS

| | | |
|---|---|---|
| 54-30855 | 3/1979 | Japan . |
| 55-156912 | 12/1980 | Japan . |
| 56-48607 | 5/1981 | Japan . |

*Primary Examiner*—John K. Corbin
*Assistant Examiner*—P. M. Dzierzynski
*Attorney, Agent, or Firm*—Cushman, Darby & Cushman

[57] ABSTRACT

A zoom lens system comprising a first lens group having positive refractive power, a second lens group having negative refractive power and a third lens group having positive refractive power, the zoom lens system being arranged to be zoomed from the wide position to the teleposition by keeping the second lens group fixed in respect to the image surface and moving the first and third lens groups respectively toward the direction away from the image surface and arranged to be focused on an object at the infinite distance up to an object at a short distance by moving the first lens group only toward the direction away from the image surface, the zoom lens system having a large zoom ratio and being compact in size.

8 Claims, 11 Drawing Figures

COMPACT ZOOM LENS SYSTEM

BACKGROUND OF THE INVENTION (a) Field of the Invention

The present invention relates to a compact zoom lens system for still cameras having a large zoom ratio from the wide position to the teleposition.

(b) Description of the Prior Art

The range of focal length most widely adopted for interchangeable lens systems for still cameras is 35 mm to 100 mm when converted to 35 mm format film size. Therefore, there ia a high demand for a zoom lens system which covers the above-mentioned range of focal lengths. In other words, there is a high demand in the market for a compact zoom lens system having the zoom ratio of 2.8 and range of field angle $2\omega = 62° \sim 24°$ and arranged to be small in size and light in weight.

This kind of known zoom lens systems are disclosed in Japanese published unexamined patent application Nos. 30855/79, 156912/80 and 48607/81. However, these zoom lens systems are not compact enough because the diameter of front lens is large and overall length is somewhat long.

SUMMARY OF THE INVENTION

It is, therefore, a primary object of the present invention to provide a compact zoom lens system for still cameras with three-group lens configuration for which the zoom ratio is 2.8 and range of field angle is $24° \sim 62°$.

The zoom lens system according to the present invention has the basic arrangement as shown in FIG. 1 and comprises a first lens group I having positive power, a second lens group II having negative power and a third lens group III having positive power. Besides, the zoom lens system according to the present invention is arranged that, at the time of zooming from the wide position to the teleposition, the first lens group I and third lens group III are moved toward the object side and the second lens group II is kept fixed in respect to the image surface. As the above-mentioned zooming method to move the first and third lens groups is adopted, it is possible to simplify the lens tube. Besides, as the second lens group which causes the largest unfavourable influence of eccentricity is arranged to be kept fixed in respect to the image surface, adjustment of lenses at the time of assembly is much simplified and it is very advantageous for the manufacture.

As the above-mentioned lens-group moving method is adopted, the zoom lens system according to the present invention enables to make the overall length of the lens system in the wide position short compared with known lens systems for example, the zoom lens system according to Japanese published unexamined patent application No. 48607/81) in which the first surface in the lens system is kept fixed in respect to the image surface at the time of zooming and, moreover, the degree of freedom at the time of the design increases. Besides, the zoom lens system according to the present invention is arranged to move the first lens group toward the object side when focusing the lens system on an object at a short distance from the state that it is focused on an object at the infinite distance.

The zooms lens system according to the present invention is characterized in that the above-mentioned zooming method is adopted as the basic arrangement and, moreover, the aperture stop is arranged to be moved, at the time of zooming, between the second lens group and third lens group independently of the movements of lens groups.

With high vari-focal ratio zoom lens systems, widths of variation of magnification to be alloted to respective lens groups are large. Therefore, in both of the wide position and teleposition, there exist such lens groups for which the distance between the principal points of those lens groups becomes large and, consequently, the states of rays become largely different in individual positions of zooming (wide position~teleposition) when the magnification is varied. For example, in case of a lens system in which the stop is provided just behind the second lens group, the front lens may have a small diameter as far as the offaxial rays in the wide position are concerned. However, in the third lens group, those rays pass through the marginal portions of respective lenses constituting the third lens group and, as a result, it becomes very difficult to well balance the quality of image formed in the central portion of image with the quality of image formed by offaxial rays. On the other hand, in case of a lens system in which the stop is provided just in front of the third lens group, the diameter of the front lens should be made very large. Besides, in the wide position, offaxial rays pass through the marginal portion of the second lens group and, therefore, it becomes difficult to correct aberrations.

Due to the reason described in the above, it is effective for improving the performance of the lens system when the position of the stop is selected so that the offaxial rays pass through respective lenses at heights most favourable for correction of aberrations when the lens system is in the wide position.

Besides, when the aperture stop is arranged to be moved according to the movements of lens groups for zooming, it is possible to prevent the lens diameters from becoming large and it is very effective for balancing of aberrations.

The zoom lens system according to the present invention is arranged that the aperture stop is located in a position approximately in the middle between the second lens group and the third lens groups and, at the same time, it is so arranged that the aperture stop is moved at the time of zooming, independently of the movements of respective lens groups, in the same direction as the moving direction of the first lens group and the third lens group by a moving amount smaller than the moving amounts of the first and third lens groups (about ½ of the moving amounts of the first and third lens groups) so that the aperture stop always comes during zooming to a position approximately in the middle between the second and third lens groups.

The focal length f of a lens system having composition similar to the zoom lens system according to the present invention can be expressed by the formula (i) shown below where reference symbol $f_1$ represents the focal length of the first lens group and reference symbols $\beta_2$ and $\beta_3$ respectively represent magnifications of the second and third lens groups.

$$f = f_1 \cdot \beta_2 \cdot \beta_3 \quad \text{(i)}$$

Besides, the distance $H_{12}$ between the principal points of the first and second lens groups can be expressed by the formula (ii) shown below where reference symbol $f_2$ represents the focal length of the second lens group.

$$H_{12} = f_1 + f_2(1 - 1/\beta_2) \quad \text{(ii)}$$

In the same way as above, the distance $H_{23}$ between the principal points of the second and third lens groups can be expressed by the formula (iii) shown below where reference symbol $f_3$ represents the focal length of the third lens group.

$$H_{23} = f_2(1-\beta_2) + f_3(1-1/\beta_3) \quad \text{(iii)}$$

When, for the distances $H_{12}$ and $H_{23}$ between the principal points and magnification $\beta_2$ and $\beta_3$, their values in the wide position are expressed by attaching the suffix W and their values in the teleposition are expressed by attaching the suffix T, the amount of variation $\Delta H_{12}$ of the distance $H_{12}$ between the principal points of the first and second lens groups when the lens system is zoomed from the wide position to the teleposition is expressed by the formula (iv) shown below.

$$\Delta H_{12} = H_{12T} - H_{12W} = f_2(1/\beta_{2W} - 1/\beta_{2T}) \quad \text{(iv)}$$

In the same way as above, the amount of variation $\Delta H_{23}$ of the distance $H_{23}$ between the principal points of the second and third lens groups is expressed by the formula (v) shown below.

$$\Delta H_{23} = H_{23W} - H_{23T} = f_2(\beta_{2T} - \beta_{2W}) + f_3(1/\beta_{3T} - 1/\beta_{3W}) \quad \text{(v)}$$

To make the lens system compact (to make the overall length of the lens system short) and to minimize the variations of aberrations to be caused at the time of zooming, it is perferable to make $\Delta H_{12}$ and $\Delta H_{23}$ small.

However, due to the reason described below, it is not possible to make $\Delta H_{12}$ and $\Delta H_{23}$ too small.

In the formula (iv), $\Delta H_{12}$ can be made small when $f_2$ is made small or $(1/\beta_{2W} - 1/\beta_{2T})$ is made small. When it is tried to make $\Delta H_{12}$ small by making $(1/\beta_{2W} - 1/\beta_{2T})$ small, the zoom ratio becomes small because the difference between $\beta_{2W}$ and $\beta_{2T}$ is made small without changing the lenses. This conflicts with the basic requirement of a high vari-focal ratio zoom lens system (requirement to make the zoom ratio as large as possible).

When $\Delta H_{12}$ is made small by making $f_2$ small without changing the value of $(1/\beta_{2W} - 1/\beta_{2T})$, the zoom ratio does not become small, and this is preferable. However, the power of the second lens group becomes strong and it becomes considerably difficult to correct aberrations caused by the second lens group. To prevent the above-mentioned aggravation of aberrations caused by the second lens group, it may be considered to increase the number of lenses constituting the second lens group. If, however, the number of lenses is increased, airspaces in respect to adjacent lens groups become small and it becomes impossible to move the lens groups largely. As a result, it becomes impossible to make the zoom ratio large.

Matters described in the above are applicable also for $\Delta H_{23}$. That is, $\Delta H_{23}$, $f_2$, $f_3$, $\beta_{2T}$, $\beta_{2W}$, $\beta_{3T}$ and $\beta_{3W}$ have the same correlation as described in the above.

Therefore, to materialize a zoom lens system which enables to attain the object of the present invention, i.e., a zoom lens system which has comparatively high vari-focal ratio and is arranged that the lens system as a whole is compact and aberrations are corrected favourably, it is very important to well balance the focal lengths of respective lens groups and ranges of magnifications of the second and third lens groups, which constitute the zooming subsystem.

From the viewpoints described so far, for the zoom lens system according to the present invention composed as explained in the above, it is effective when said zoom lens system is arranged to fulfill the following conditions where reference symbol $f_W$ represents the focal length of the lens system as a whole in the wide position.

(1) $1.5 < f_1/f_W < 2.5$
(2) $-0.65 < f_2/f_W < -0.39$
(3) $-1.6 < 1/\beta_{2W} - 1/\beta_{2T} < -0.7$  $1.8 < \beta_{2T}/\beta_{2W} < 2.2$
(4) $0.75 < f_3/f_W < 1.1$
(5) $0.2 < 1/\beta_{3T} - 1/\beta_{3W} < 0.3$  $1.2 < \beta_{3T}/\beta_{3W} < 1.6$ The condition (1) defines the focal length of the first lens group. This condition serves in combination with the conditions (3) and (5) to obtain a compact zoom lens system which covers the range of field angle $2\omega = 62° \sim 24°$ (focal length in the range of 36 mm to 101 mm when converted to 35 mm format film size). If, in the condition (1), $f_1/f_W$ becomes larger than the upper limit or smaller than the lower limit, aberrations become unfavourable. Besides, the amounts of variation of magnifications $\beta_2$ and $\beta_3$ necessarily become large, and the balance of distances between lens groups described below becomes unfavourable. That is, in case of a zoom lens system composed liked the zoom lens system according to the present invention, the distance between the first lens group I and the second lens group II becomes short in the wide position and the distance between the second lens group II and the third lens group III becomes short in the teleposition. When the first lens group I and the third lens group III are moved as described in the above, it is perferable to arrange that the positions of said lens groups after movement become approximately the same as the position obtained by reversing the positions of said lens groups before movement round the fixed lens group (the second lens group II). In other words, it is perferable to arrange that the first and third lens groups are moved in such manner that, for example, the distance between the first and second lens groups in the wide position becomes approximately the same as the distance between the second and third lens groups in the teleposition because this manner of lens group movements is favourable for correction of aberrations and balancing of powers of respective lens groups. Therefore, the above-mentioned lens group moving method is called the moving method in which the distances between lens groups are well balanced.

The condition (2) relates to the condition (3) and defines the range of $\Delta H_{12}$ expressed by the formula (iv). If $f_2/f_w$ becomes smaller than the lower limit of the condition (2), $\Delta H_{12}$ becomes large. If, on the contrary, $f_2/f_W$ becomes larger than the upper limit of the condition (2), power of the second lens group becomes too strong and aberrations caused by the second lens group become large.

The condition (3) relates to the condition (2) as it is evident from the formula (iv). If the values defined by the condition (3) becomes smaller than the lower limits thereof, $\Delta H_{12}$ becomes large and it becomes impossible to make the lens system compact. If, on the contrary, the values defined by the condition (3) become larger than the upper limits thereof, it becomes impossible to make the zoom ratio large though $\Delta H_{12}$ becomes small.

The condition (4) relates to the condition (5) and defines the distance between the second lens group and the third lens group. If $f_3/f_W$ becomes smaller than the lower limit of the condition (4), power of the third lens group becomes too strong and it is not preferable for correction of aberrations. Besides, the balance of distances between lens groups in the afore-mentioned meaning becomes unsatisfactory. If, on the contrary, $f_3/f_W$ becomes larger than the upper limit of the condition (4), the value of $\Delta H_{23}$ becomes large and, moreover, the distance from the lens system to the image surface becomes too large. Therefore, it becomes impossible to make the lens system compact.

The condition (5) is established based on the relation between the condition (4) and formula (v). If the values defined by the condition (5) become larger than the upper limits thereof, it becomes impossible to make the lens system compact. Besides, as the offaxial rays pass through the marginal posrtion of the third lens group, aberrations are aggravated. If, on the contrary, the values defined by the condition (5) become smaller than the lower limits thereof, it becomes impossible to make the zoom ratio large.

DETAILED DESCRIPTION OF THE PREFERRED EMBODIMENTS

Now, preferred embodiments of the zoom lens system according to the present invention are described below.

Figure 1:
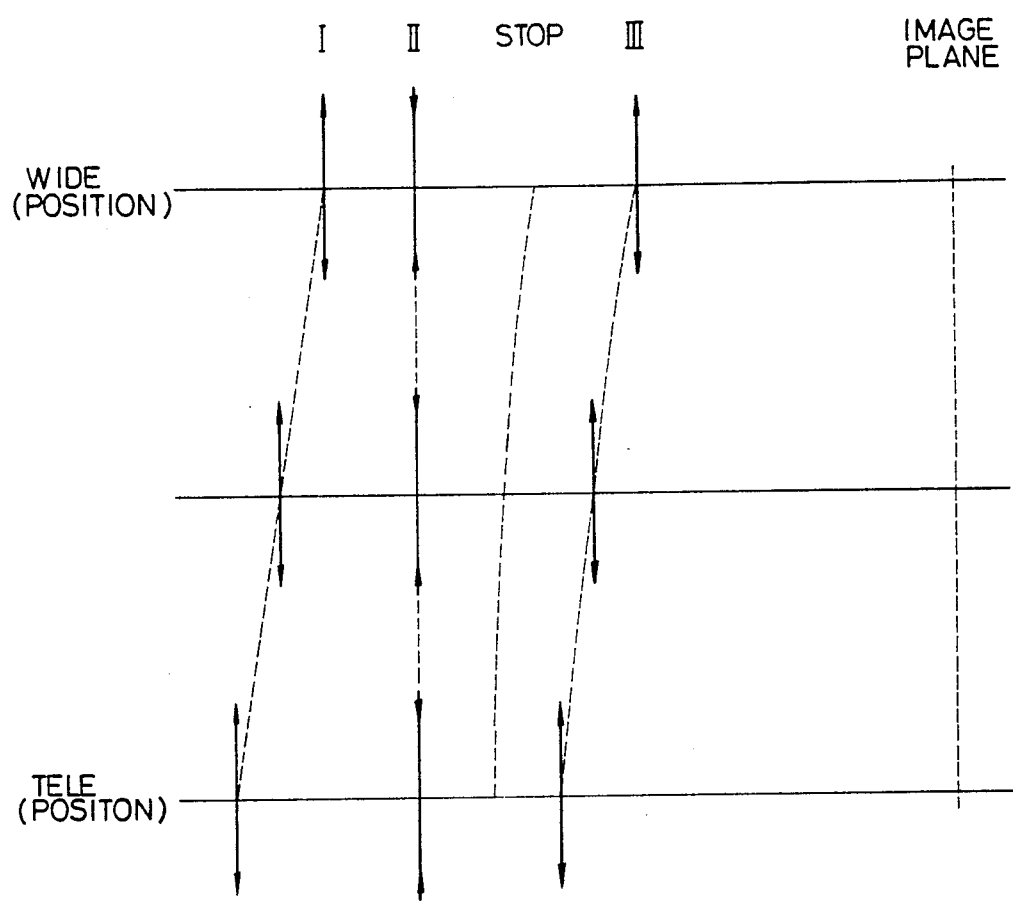
FIG. 1 shows the basic arrangement of the zoom lens system according to the present invention.
Figure 2:
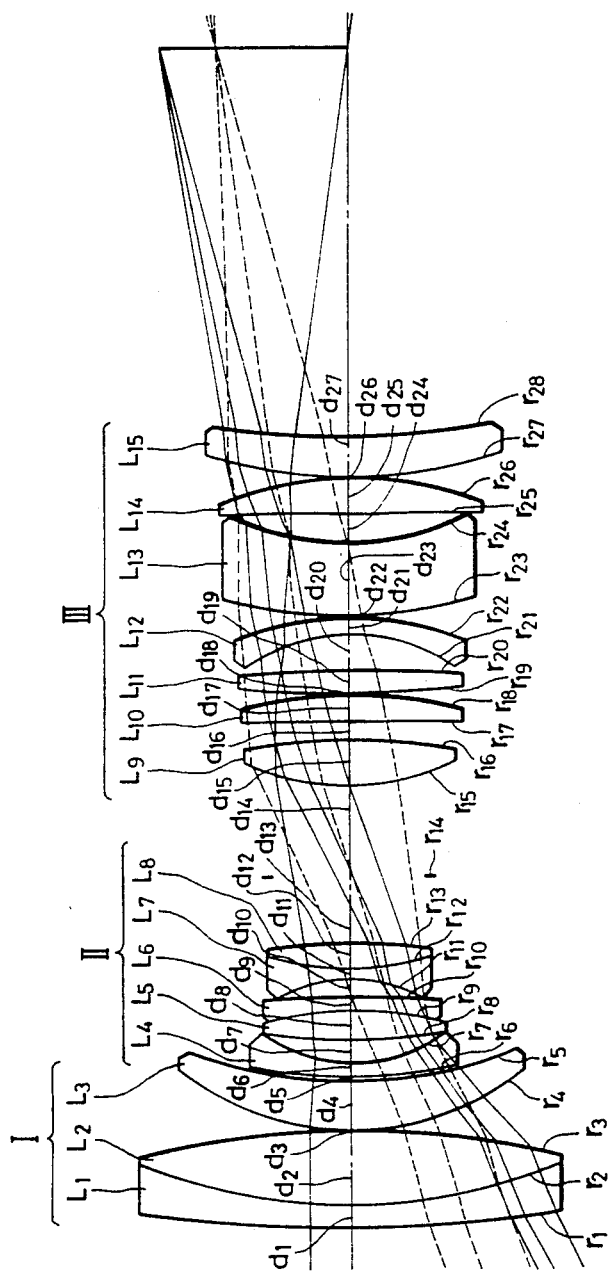
FIG. 2 shows a sectional view of the zoom lens system according to the present invention.
Figure 3:
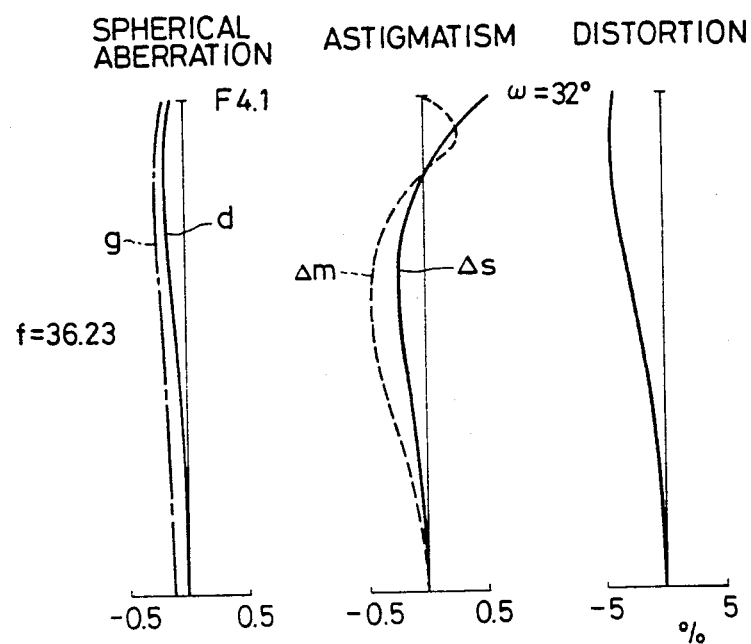
FIGS. 3 through 5 respectively show graphs illustrating aberration curves of Embodiment 1 of the present invention at $f=36.23$, $f=60.5$ and $f=101.3$.
Figure 4:
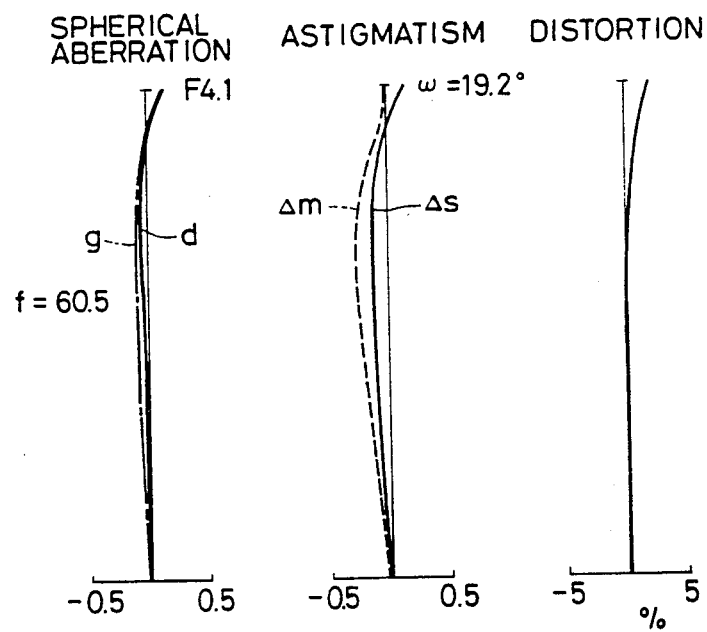
Figure 5:
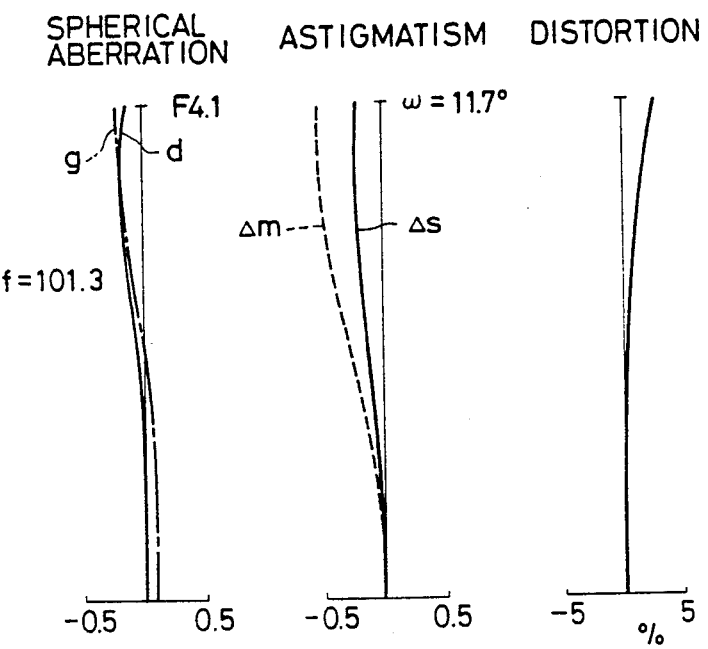
Figure 6:
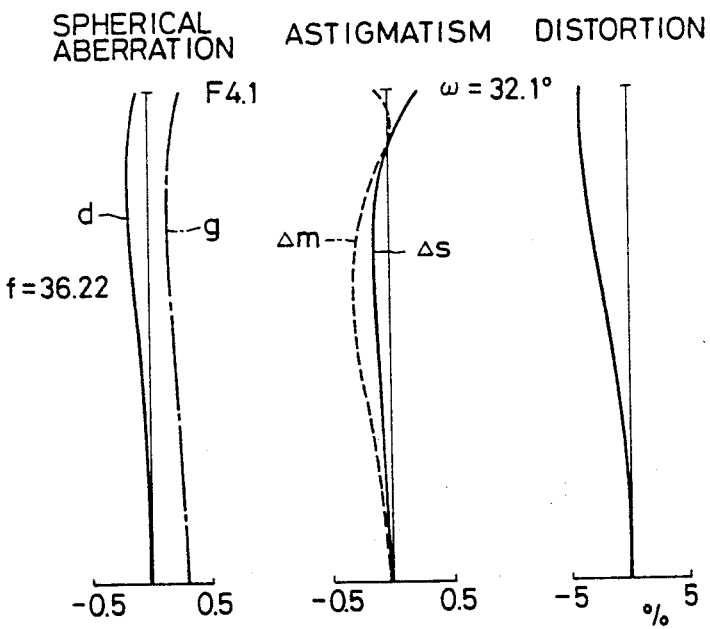
FIGS. 6 through 8 respectively show graphs illustrating aberration curves of Embodiment 2 of the present invention at $f=36.22$, $f=60.5$ and $f=101.3$.
Figure 7:
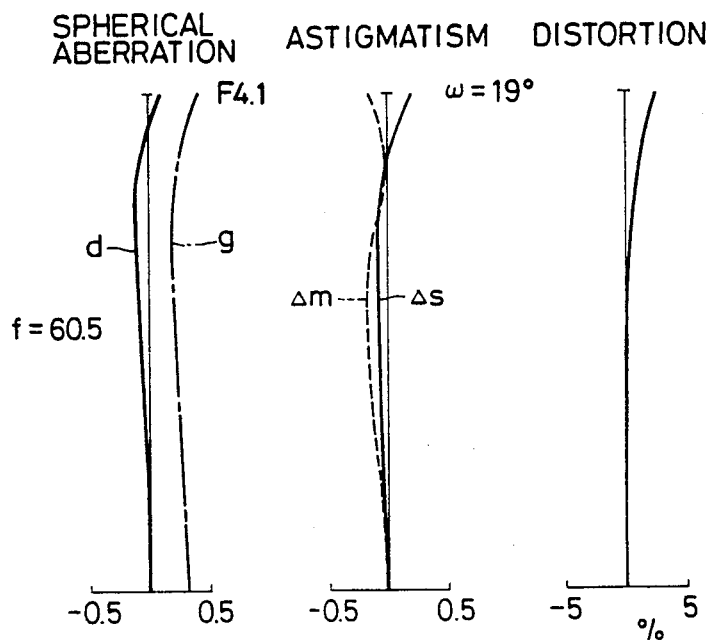
Figure 8:
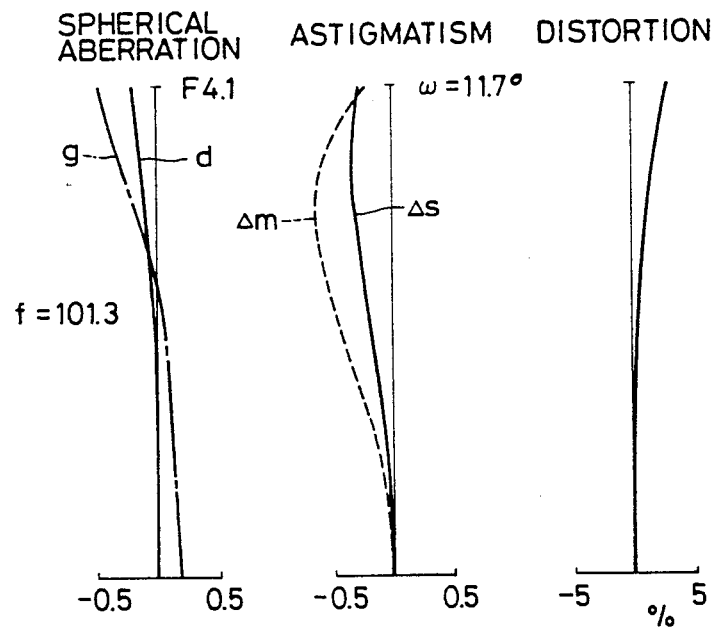
Figure 9:
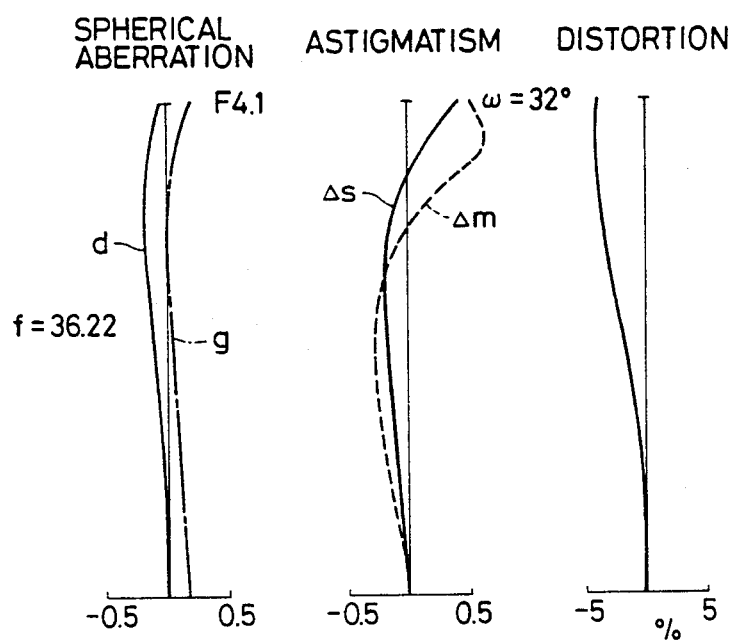
FIGS. 9 through 11 respectively show graphs illustrating aberration curves of Embodiment 3 of the present invention at $f=36.22$, $f=64.35$ and $f=101.35$.
Figure 10:
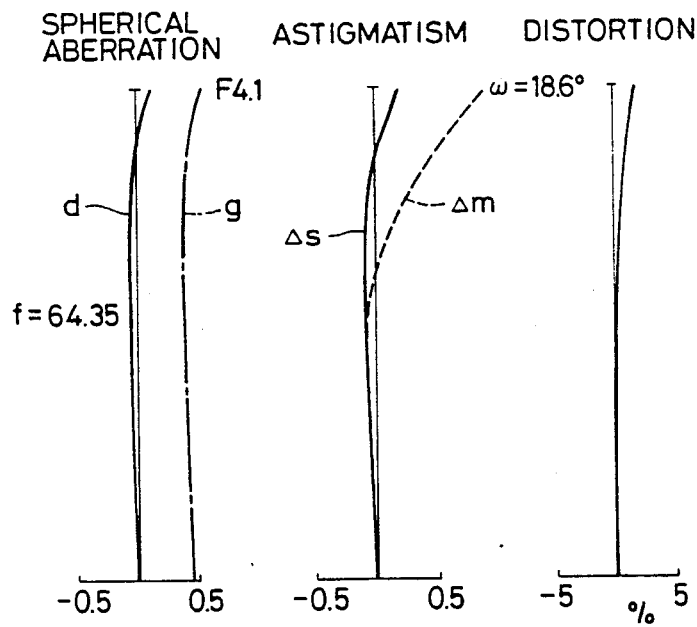
Figure 11:
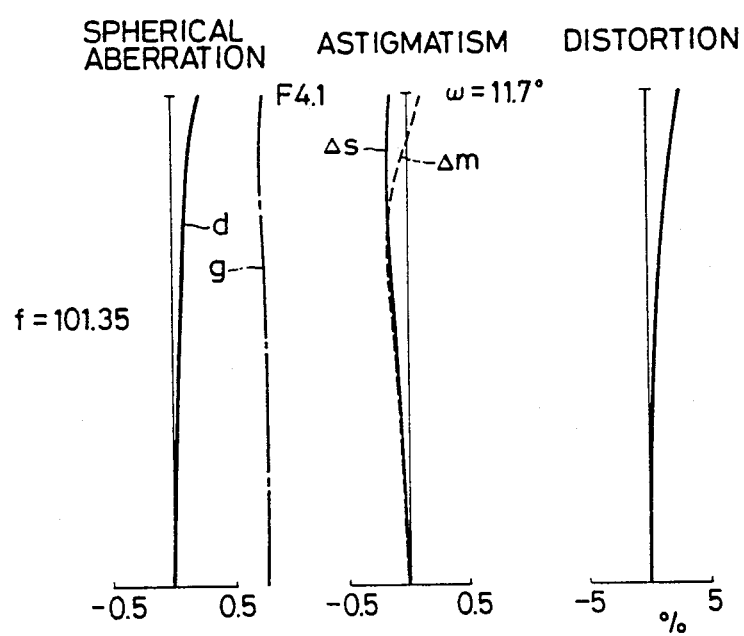

As shown in FIG. 2 illustrating the sectional view of the zoom lens system according to the present invention, preferred embodiments of the zoom lens system according to the present invention are arranged that the first lens group I comprises a cemented doublet $L_1$, $L_2$ and a positive meniscus lens $L_3$, the second lens group II comprises a negative meniscus lens $L_4$, a cemented doublet $L_5$, $L_6$ and a cemented doublet $L_7$, $L_8$, and the third lens group III comprises a positive lens $L_9$, a positive lens $L_{10}$, a positive lens $L_{11}$ (these three positive lenses may be arranged as two positive lenses), a negative meniscus lens $L_{12}$ arranged to be concave toward the object side, a negative meniscuc lens $L_{13}$ arranged to be convex toward the object side, a positive lens $L_{14}$ and a positive lens $L_{15}$. By adopting the above-mentioned lens configuration, the zoom lens system according to the present invention is arranged to well balance aberrations.

In the above-mentioned lens configuration, the third lens group is arranged to have the basic composition of triplet type. However, the number of lens elements constituting respective lens components in the triplet type composition are increased in order to increase the aberration correcting capacity. Out of these lens components, the negative lens component is important and it is arranged to comprise the negative meniscus lens $L_{12}$ which is concave toward the object side and the negative meniscus lens $L_{13}$ which is convex toward the object side. Out of them, the lens $L_{12}$ is arranged to have a surface with strong negative power on the object side (surface $r_{21}$) in order to maintain symmetry of offaxial rays. Besides, to correct overcorrected spherical aberration which is caused by the second lens group and the above-mentioned surface with strong negative power $(r_{21})$, it is so arranged that an air lens with strong positive power is formed between the lens $L_{12}$ and lens $L_{13}$. Furthermore, for these negative lens elements, the radius of curvature R of the surface on the image side of the lens $L_{13}$ ($r_{24}$ in FIG. 2) and total thickness D of the lenses $L_{12}$ and $L_{13}$ ($d_{21}+d_{23}$ in FIG. 2) are selected in the ranges which fulfill the following conditions.

(6) $0.7<R/f_3<1.2$
(7) $0.25<D/f_3<0.35$

In the condition (6), $R/f_3$ is defined to be smaller than the upper limit of 1.2 in order to arrange that the principal point of the third lens group comes to a position shifted from the surface $r_{15}$ toward the image side by an amount about ¼ of the thickness of the third lens group and to thereby keep $H_{23}$ in the wide position as large as possible. Besides, $R/f_3$ is defined to be larger than the lower limit of 0.7 in order to correct spherical aberration and coma favourably.

The condition (7) defines the range of D for the purpose of correcting astigmatic difference caused by the first and second lens groups. If $D/f_3$ becomes larger than the upper limit of the condition (7), it becomes difficult to limit offaxial aberrations and distortion by keeping the lens system compact. If $D/f_3$ becomes smaller than the lower limit of the condition (7), it becomes difficult to keep astigmatic difference as a small value.

Now preferred embodiments of the zoom lens system according to the present invention are shown below.

| Embodiment 1 | | | |
|---|---|---|---|
| $r_1 = 136.988$ | | | |
| $d_1 = 2.5$ | | $n_1 = 1.80518$ | $\nu_1 = 25.43$ |
| $r_2 = 53.184$ | | | |
| $d_2 = 9$ | | $n_2 = 1.51633$ | $\nu_2 = 64.15$ |
| $r_3 = -104.043$ | | | |
| $d_3 = 0.1$ | | | |
| $r_4 = 30.479$ | | | |
| $d_4 = 4.8$ | | $n_3 = 1.65160$ | $\nu_3 = 58.67$ |
| $r_5 = 56.486$ | | | |
| $d_5 = l_1$ | | $(0.764 \sim 9.901 \sim 17.377)$ | |
| $r_6 = 52.644$ | | | |
| $d_6 = 1.5$ | | $n_4 = 1.77250$ | $\nu_4 = 49.66$ |
| $r_7 = 16.297$ | | | |
| $d_7 = 3.2$ | | | |
| $r_8 = 152.848$ | | | |
| $d_8 = 3$ | | $n_5 = 1.72825$ | $\nu_5 = 28.46$ |
| $r_9 = -40.125$ | | | |
| $d_9 = 1$ | | $n_6 = 1.72$ | $\nu_6 = 50.25$ |
| $r_{10} = 76.052$ | | | |
| $d_{10} = 2.8$ | | | |
| $r_{11} = -17.423$ | | | |
| $d_{11} = 1$ | | $n_7 = 1.66671$ | $\nu_7 = 57.33$ |
| $r_{12} = 27.345$ | | | |
| $d_{12} = 3.2$ | | $n_8 = 1.83400$ | $\nu_8 = 37.16$ |
| $r_{13} = -55.989$ | | | |
| $d_{13} = l_2$ | | $(7.673 \sim 2.376 \sim 0.548)$ | |
| $r_{14} = \infty$ (stop) | | | |
| $d_{14} = l_2$ | | $(10.418 \sim 7.184 \sim 0.293)$ | |
| $r_{15} = 31.182$ | | | |
| $d_{15} = 5.14$ | | $n_9 = 1.48749$ | $\nu_9 = 70.15$ |
| $r_{16} = -80.213$ | | | |
| $d_{16} = 2$ | | | |
| $r_{17} = 957.849$ | | | |
| $d_{17} = 3.3$ | | $n_{10} = 1.48749$ | $\nu_{10} = 70.15$ |
| $r_{18} = -61.412$ | | | |
| $d_{18} = 0.11$ | | | |
| $r_{19} = 100.245$ | | | |

-continued

Embodiment 1

| | | |
|---|---|---|
| $d_{19} = 3$ | $n_{11} = 1.617$ | $\nu_{11} = 62.79$ |
| $r_{20} = -131.354$ | | |
| $d_{20} = 4.25$ | | |
| $r_{21} = -22.878$ | | |
| $d_{21} = 2$ | $n_{12} = 1.84666$ | $\nu_{12} = 23.88$ |
| $r_{22} = -35.645$ | | |
| $d_{22} = 0.2$ | | |
| $r_{23} = 68.089$ | | |
| $d_{23} = 8.05$ | $n_{13} = 1.80518$ | $\nu_{13} = 25.43$ |
| $r_{24} = 30.546$ | | |
| $d_{24} = 3.47$ | | |
| $r_{25} = 15585.232$ | | |
| $d_{25} = 4$ | $n_{14} = 1.61921$ | $\nu_{14} = 60.27$ |
| $r_{26} = -45.091$ | | |
| $d_{26} = 0.11$ | | |
| $r_{27} = 51.892$ | | |
| $d_{27} = 5.08$ | $n_{15} = 1.55960$ | $\nu_{15} = 58.63$ |
| $r_{28} = 133.727$ | | |

$f = 36.235 \sim 101.295$, F 4.1
$f_1 = 62.433$, $f_1/f_W = 1.717$
$f_2 = -17.786$, $f_2/f_W = -0.491$
$f_3 = 32.417$, $f_3/f_W = 0.895$
$\beta_{2W} = -0.5091$, $\beta_{2S} = -0.6894$, $\beta_{2T} = -0.9707$
$\beta_{3W} = -1.1401$, $\beta_{3S} = -1.4033$, $\beta_{3T} = -1.6723$
$1/\beta_{2W} - 1/\beta_{2T} = -0.994$, $\beta_{2T}/\beta_{2W} = 1.907$
$1/\beta_{3T} - 1/\beta_{3W} = 0.279$, $\beta_{3T}/\beta_{3W} = 1.467$
$r_{24}/f_3 = 0.942$, $(d_{21} + d_{23})/f_3 = 0.31$

Embodiment 2

| | | |
|---|---|---|
| $r_1 = 325.502$ | | |
| $d_1 = 2.5$ | $n_1 = 1.81379$ | $\nu_1 = 35.4$ |
| $r_2 = 50.724$ | | |
| $d_2 = 9$ | $n_2 = 1.51633$ | $\nu_2 = 68.96$ |
| $r_3 = -85.321$ | | |
| $d_3 = 0.1$ | | |
| $r_4 = 35.934$ | | |
| $d_4 = 5.2$ | $n_3 = 1.834$ | $\nu_3 = 40.62$ |
| $r_5 = 56.505$ | | |
| $d_5 = l_1$ | $(1.531 \sim 16.459 \sim 27.537)$ | |
| $r_6 = 65.784$ | | |
| $d_6 = 1.5$ | $n_4 = 1.834$ | $\nu_4 = 47.72$ |
| $r_7 = 16.446$ | | |
| $d_7 = 3.2$ | | |
| $r_8 = -93.764$ | | |
| $d_8 = 3.6$ | $n_5 = 1.48749$ | $\nu_5 = 46.35$ |
| $r_9 = -44.124$ | | |
| $d_9 = 1$ | $n_6 = 1.83481$ | $\nu_6 = 46.83$ |
| $r_{10} = -77.685$ | | |
| $d_{10} = 2.8$ | | |
| $r_{11} = -18.935$ | | |
| $d_{11} = 1$ | $n_7 = 1.66259$ | $\nu_7 = 61.89$ |
| $r_{12} = 27.100$ | | |
| $d_{12} = 3$ | $n_8 = 1.83481$ | $\nu_8 = 36.61$ |
| $r_{13} = -45.231$ | | |
| $d_{13} = l_{21}$ | $(6.82 \sim 1.522 \sim 0.25)$ | |
| $r_{14} = \infty$ (stop) | | |
| $d_{14} = l_{22}$ | $(10.418 \sim 7.707 \sim 0.6)$ | |
| $r_{15} = 28.716$ | | |
| $d_{15} = 5.14$ | $n_9 = 1.48749$ | $\nu_9 = 70.15$ |
| $r_{16} = -161.540$ | | |
| $d_{16} = 2.3$ | | |
| $r_{17} = 558.626$ | | |
| $d_{17} = 3.3$ | $n_{10} = 1.56873$ | $\nu_{10} = 68.78$ |
| $r_{18} = -64.622$ | | |
| $d_{18} = 0.11$ | | |
| $r_{19} = 92.049$ | | |
| $d_{19} = 3$ | $n_{11} = 1.63306$ | $\nu_{11} = 63.26$ |
| $r_{20} = -137.918$ | | |
| $d_{20} = 4.25$ | | |
| $r_{21} = -24.097$ | | |
| $d_{21} = 2$ | $n_{12} = 1.82889$ | $\nu_{12} = 20.34$ |
| $r_{22} = -42.366$ | | |
| $d_{22} = 0.2$ | | |
| $r_{23} = 100.979$ | | |
| $d_{23} = 8.16$ | $n_{13} = 1.83641$ | $\nu_{13} = 31.52$ |
| $r_{24} = 30.921$ | | |
| $d_{24} = 3.47$ | | |

-continued

Embodiment 2

| | | |
|---|---|---|
| $r_{25} = 345.629$ | | |
| $d_{25} = 4$ | $n_{14} = 1.62026$ | $\nu_{14} = 59.37$ |
| $r_{26} = -56.495$ | | |
| $d_{26} = 0.1$ | | |
| $r_{27} = 63.594$ | | |
| $d_{27} = 5.08$ | $n_{15} = 1.56873$ | $\nu_{15} = 57.74$ |
| $r_{28} = -291.508$ | | |

$f = 36.22 \sim 101.307$, F 4.1
$f_1 = 80.018$, $f_1/f_W = 2.209$
$f_2 = -20.157$, $f_2/f_W = -0.557$
$f_3 = 35.169$, $f_3/f_W = 0.971$
$\beta_{2W} = -0.3876$, $\beta_{2S} = -0.5436$, $\beta_{2T} = -0.7752$
$\beta_{3W} = -1.1678$, $\beta_{3S} = -1.3929$, $\beta_{3T} = -1.6339$
$1/\beta_{2W} - 1/\beta_{2T} = -1.29$, $\beta_{2T}/\beta_{2W} = 2$
$1/\beta_{3T} - 1/\beta_{3W} = 0.244$, $\beta_{3T}/\beta_{3W} = 1.399$
$r_{24}/f_3 = 0.896$, $(d_{21} + d_{23})/f_3 = 0.295$

Embodiment 3

| | | |
|---|---|---|
| $r_1 = 148.501$ | | |
| $d_1 = 2.5$ | $n_1 = 1.80518$ | $\nu_1 = 25.43$ |
| $r_2 = 58.233$ | | |
| $d_2 = 9$ | $n_2 = 1.51633$ | $\nu_2 = 64.15$ |
| $r_3 = -106.930$ | | |
| $d_3 = 0.1$ | | |
| $r_4 = 31.261$ | | |
| $d_4 = 5.2$ | $n_3 = 1.72916$ | $\nu_3 = 54.68$ |
| $r_5 = 56.152$ | | |
| $d_5 = l_1$ | $(0.55 \sim 10.49 \sim 16.62)$ | |
| $r_6 = 53.077$ | | |
| $d_6 = 1.5$ | $n_4 = 1.7725$ | $\nu_4 = 49.66$ |
| $r_7 = 15.712$ | | |
| $d_7 = 3.2$ | | |
| $r_8 = 139.937$ | | |
| $d_8 = 3.4$ | $n_5 = 1.60342$ | $\nu_5 = 38.01$ |
| $r_9 = -29.521$ | | |
| $d_9 = 1$ | $n_6 = 1.804$ | $\nu_6 = 46.57$ |
| $r_{10} = 207.838$ | | |
| $d_{10} = 2.8$ | | |
| $r_{11} = -18.409$ | | |
| $d_{11} = 1$ | $n_7 = 1.66687$ | $\nu_7 = 57.33$ |
| $r_{12} = 28.284$ | | |
| $d_{12} = 3.2$ | $n_8 = 1.834$ | $\nu_8 = 37.16$ |
| $r_{13} = -54.062$ | | |
| $d_{13} = l_{21}$ | $(7.4 \sim 1.402 \sim 0.274)$ | |
| $r_{14} = \infty$ (stop) | | |
| $d_{14} = l_{22}$ | $(10.42 \sim 7 \sim 0.4)$ | |
| $r_{15} = 31.123$ | | |
| $d_{15} = 5.14$ | $n_9 = 1.48749$ | $\nu_9 = 70.15$ |
| $r_{16} = -76.631$ | | |
| $d_{16} = 2.02$ | | |
| $r_{17} = 1490.2$ | | |
| $d_{17} = 3.3$ | $n_{10} = 1.48749$ | $\nu_{10} = 70.15$ |
| $r_{18} = -60.161$ | | |
| $d_{18} = 0.1$ | | |
| $r_{19} = 109.458$ | | |
| $d_{19} = 3$ | $n_{11} = 1.617$ | $\nu_{11} = 62.79$ |
| $r_{20} = -140.632$ | | |
| $d_{20} = 4.25$ | | |
| $r_{21} = -22.961$ | | |
| $d_{21} = 2$ | $n_{12} = 1.84666$ | $\nu_{12} = 23.88$ |
| $r_{22} = -35.748$ | | |
| $d_{22} = 0.2$ | | |
| $r_{23} = 67.841$ | | |
| $d_{23} = 8.15$ | $n_{13} = 1.80518$ | $\nu_{13} = 25.43$ |
| $r_{24} = 30.118$ | | |
| $d_{24} = 3.47$ | | |
| $r_{25} = -1582.82$ | | |
| $d_{25} = 4$ | $n_{14} = 1.61941$ | $\nu_{14} = 60.27$ |
| $r_{26} = -43.736$ | | |
| $d_{26} = 0.11$ | | |
| $r_{27} = 45.619$ | | |
| $d_{27} = 5.08$ | $n_{15} = 1.56101$ | $\nu_{15} = 58.63$ |
| $r_{28} = 108.887$ | | |

$f = 36.22 \sim 101.35$, F 4.1
$f_1 = 60.207$, $f_1/f_W = 1.662$
$f_2 = -17.331$, $f_2/f_W = -0.478$
$f_3 = 32.637$, $f_3/f_W = 0.901$ -continued Embodiment 3

$\beta_2W = -0.5204, \beta_2S = -0.7419, \beta_2T = -1.0057$
$\beta_3W = -1.156, \beta_3S = -1.440, \beta_3T = -1.674$
$1/\beta_2W - 1/\beta_2T = -0.927, \beta_2T/\beta_2W = 1.933$
$1/\beta_3T - 1/\beta_3W = 0.268, \beta_3T/\beta_3W = 1.448$
$r_{24}/f_3 = 0.923, (d_{21} + d_{23})/f_3 = 0.31$ In embodiments shown in the above, reference symbols $r_1$ through $r_{28}$ respectively represent radii of curvature of respective lens surfaces, reference symbols $d_1$ through $d_{27}$ respectively represent thicknesses of respective lenses and airspaces between respective lenses, reference symbols $n_1$ through $n_{15}$ respectively represent refractive indices of respective lenses, reference symbols $\nu_1$ through $\nu_{15}$ respectively represent Abbe's numbers of respective lenses, reference symbol $f_W$ represents the focal length of the lens system as a whole in the wide position, reference symbols $\beta_2W$, $\beta_2S$ and $\beta_2T$ respectively represent maginifications of the second lens group in the wide position, standard position and teleposition, and reference symbols $\beta_3W$, $\beta_3S$ and $\beta_3T$ respectively represent magnifications of the third lens group in the wide position, standard position and teleposition.

In respective embodiments shown in the above, the second lens group is kept fixed in respect to the image surface and the first lens group, the third lens group and the stop are moved. Therefore, airspaces $d_5=l_1$, $d_{13}=l_2$ and $d_{14}=l_3$ vary ($d_{13}$ represents the airspace between the second lens group and the stop, and $d_{14}$ represents the airspace between the stop and the third lens group). Values of these variable airspaces in the wide position, standard position and teleposition are shown in parentheses in the numerical data of respective embodiments.

I claim:

1. A zoom lens system consisting of, in order from the object side, a first lens group located in the foremost position and having positive refractive power, a second lens group located in a position subsequent to said first lens group and having negative refractive power, and a third lens group located subsequent to said second lens group and having positive refractive power, said zoom lens system being zoomed from a wide position to a teleposition by keeping said second lens group fixed with respect to an image surface, and moving said first lens group and said third lens group respectively toward the direction away from the image surface independently of each other by individually different amounts of movements, said zoom lens system being focused on an object at an infinite distance up to an object at a short distance by moving only said first lens group toward the direction away from the image surface.

2. A zoom lens system according to claim 1, further comprising: an aperture stop located between said second lens group and said third lens group, said stop arranged to be moved during zooming independently of the movements of said respective lens groups.

3. A zoom lens system according to claim 2, wherein said aperture stop is moved to a position approximately in the middle of said second lens group and said third lens group.

4. A zoom lens system according to claim 3, wherein said zoom lens system is arranged to fulfill the following conditions:

(1) $1.5 < f_1 f_W < 2.5$
(2) $-0.65 < f_2/f_W < -0.39$
(3) $-1.6 < 1/\beta_2W - 1/\beta_2T < -0.7$   $1.8 < \beta_2T/\beta_2W < 2.2$
(4) $0.75 < f_3/f_W < 1.1$
(5) $0.2 < 1/\beta_3T - 1/\beta_3W < 0.3$   $1.2 < \beta_3T/\beta_3W < 1.6$ wherein, reference symbol $f_W$ represents the focal length of the lens system as a whole in the wide position, reference symbols $f_1$, $f_2$ and $f_3$ respectively represent focal lengths of the first, second and third lens groups, reference symbols $\beta_2T$ and $\beta_2W$ respectively represent magnifications of the second lens group in the teleposition and wide position, and reference symbols $\beta_3T$ and $\beta_3W$ respectively represent magnifications of the third lens group in the teleposition and wide position.

5. A zoom lens system according to claim 4, wherein said third lens group at least comprises a negative meniscus lens arranged to be concave toward the object side and a negative meniscus lens arranged to be convex toward the object side and located adjacent to and on the image side of said negative meniscus lens concave toward the object side, and wherein said zoom lens system is arranged to further fulfill the following conditions:

(6) $0.7 < R/f_3 < 1.2$
(7) $0.25 < D/f_3 < 0.35$ wherein, reference symbol R represents the radius of curvature of the surface on the image side of said negative meniscus lens arranged to be convex toward the object side, and reference symbol D represents the total thickness of said two negative meniscus lenses.

6. A zoom lens system according to claim 5, wherein said first lens group comprises a cemented doublet and a positive meniscus lens, said second lens group comprises a negative meniscus lens and two cemented doublets, and said third lens group comprises three positive lenses, a negative meniscus lens arranged to be concave toward the object side, a negative meniscus lens arranged to be convex toward the object side, and two positive lenses, said zoom lens system having the following numerical data:

| | | |
|---|---|---|
| $r_1 = 136.988$ | | |
| $d_1 = 2.5$ | $n_1 = 1.80518$ | $\nu_1 = 25.43$ |
| $r_2 = 53.184$ | | |
| $d_2 = 9$ | $n_2 = 1.51633$ | $\nu_2 = 64.15$ |
| $r_3 = -104.043$ | | |
| $d_3 = 0.1$ | | |
| $r_4 = 30.479$ | | |
| $d_4 = 4.8$ | $n_3 = 1.65160$ | $\nu_3 = 58.67$ |
| $r_5 = 56.486$ | | |
| $d_5 = l_1$ | $(0.764 \sim 9.901 \sim 17.377)$ | |
| $r_6 = 52.644$ | | |
| $d_6 = 1.5$ | $n_4 = 1.77250$ | $\nu_4 = 49.66$ |
| $r_7 = 16.297$ | | |
| $d_7 = 3.2$ | | |
| $r_8 = 152.848$ | | |
| $d_8 = 3$ | $n_5 = 1.72825$ | $\nu_5 = 28.46$ |
| $r_9 = -40.125$ | | |
| $d_9 = 1$ | $n_6 = 1.72$ | $\nu_6 = 50.25$ |
| $r_{10} = 76.052$ | | |
| $d_{10} = 2.8$ | | |
| $r_{11} = -17.423$ | | |
| $d_{11} = 1$ | $n_7 = 1.66671$ | $\nu_7 = 57.33$ |
| $r_{12} = 27.345$ | | |
| $d_{12} = 3.2$ | $n_8 = 1.83400$ | $\nu_8 = 37.16$ |
| $r_{13} = -55.989$ | | |

-continued

| | | |
|---|---|---|
| $d_{13} = l_{21}$ | $(7.673 \sim 2.376 \sim 0.548)$ | |
| $r_{14} = \infty$ (stop) | | |
| $d_{14} = l_{22}$ | $(10.418 \sim 7.184 \sim 0.293)$ | |
| $r_{15} = 31.182$ | | |
| $d_{15} = 5.14$ | $n_9 = 1.48749$ | $\nu_9 = 70.15$ |
| $r_{16} = -80.213$ | | |
| $d_{16} = 2$ | | |
| $r_{17} = 957.849$ | | |
| $d_{17} = 3.3$ | $n_{10} = 1.48749$ | $\nu_{10} = 70.15$ |
| $r_{18} = -61.412$ | | |
| $d_{18} = 0.11$ | | |
| $r_{19} = 100.245$ | | |
| $d_{19} = 3$ | $n_{11} = 1.617$ | $\nu_{11} = 62.79$ |
| $r_{20} = -131.354$ | | |
| $d_{20} = 4.25$ | | |
| $r_{21} = -22.878$ | | |
| $d_{21} = 2$ | $n_{12} = 1.84666$ | $\nu_{12} = 23.88$ |
| $r_{22} = -35.645$ | | |
| $d_{22} = 0.2$ | | |
| $r_{23} = 68.089$ | | |
| $d_{23} = 8.05$ | $n_{13} = 1.80518$ | $\nu_{13} = 25.43$ |
| $r_{24} = 30.546$ | | |
| $d_{24} = 3.47$ | | |
| $r_{25} = 15585.232$ | | |
| $d_{25} = 4$ | $n_{14} = 1.61921$ | $\nu_{14} = 60.27$ |
| $r_{26} = -45.091$ | | |
| $d_{26} = 0.11$ | | |
| $r_{27} = 51.892$ | | |
| $d_{27} = 5.08$ | $n_{15} = 1.55960$ | $\nu_{15} = 58.63$ |
| $r_{28} = 133.727$ | | |

$f = 36.235 \sim 101.295$, F 4.1
$f_1 = 62.433$, $f_1/f_W = 1.717$
$f_2 = -17.786$, $f_2/f_W = -0.491$
$f_3 = 32.417$, $f_3/f_W = 0.895$
$\beta_2 W = -0.5091$, $\beta_2 S = -0.6894$, $\beta_2 T = -0.9707$
$\beta_3 W = -1.1401$, $\beta_3 S = -1.4033$, $\beta_3 T = -1.6723$
$1/\beta_2 W - 1/\beta_2 T = -0.994$, $\beta_2 T/\beta_2 W = 1.907$
$1/\beta_3 T - 1/\beta_3 W = 0.279$, $\beta_3 T/\beta_3 W = 1.467$
$r_{24}/f_3 = 0.942$, $(d_{21} + d_{23})/f_3 = 0.31$ wherein reference symbols $r_1$ through $r_{28}$ respectively represent radii of curvature of respective lens surfaces, reference symbols $d_1$ through $d_{27}$ respectively represent thicknesses of respective lenses and airspaces between respective lenses, reference symbols $n_1$ through $n_{15}$ respectively represent refractive indices of respective lenses, reference symbols $\nu_1$ through $\nu_{15}$ respectively represent Abbe's numbers of respective lenses, and reference symbols $\beta_2 S$ and $\beta_3 S$ respectively represent magnifications of the second and third lens groups in the standard position.

7. A zoom lens system according to claim 5, wherein said first lens group comprises a cemented doublet and a positive meniscus lens, said second lens group comprises a negative meniscus lens and two cemented doublets, and said third lens group comprises three positive lenses, a negative meniscus lens arranged to be concave toward the object side, a negative meniscus lens arranged to be convex toward the object side, and two positive lenses, said zoom lens system having the following numerical data:

| | | |
|---|---|---|
| $r_1 = 325.502$ | | |
| $d_1 = 2.5$ | $n_1 = 1.81379$ | $\nu_1 = 35.4$ |
| $r_2 = 50.724$ | | |
| $d_2 = 9$ | $n_2 = 1.51633$ | $\nu_2 = 68.96$ |
| $r_3 = -85.321$ | | |
| $d_3 = 0.1$ | | |
| $r_4 = 35.934$ | | |
| $d_4 = 5.2$ | $n_3 = 1.834$ | $\nu_3 = 40.62$ |
| $r_5 = 56.505$ | | |
| $d_5 = l_1$ | $(1.531 \sim 16.459 \sim 27.537)$ | |

-continued

| | | |
|---|---|---|
| $r_6 = 65.784$ | | |
| $d_6 = 1.5$ | $n_4 = 1.834$ | $\nu_4 = 47.72$ |
| $r_7 = 16.446$ | | |
| $d_7 = 3.2$ | | |
| $r_8 = -93.764$ | | |
| $d_8 = 3.6$ | $n_5 = 1.48749$ | $\nu_5 = 46.35$ |
| $r_9 = -44.124$ | | |
| $d_9 = 1$ | $n_6 = 1.83481$ | $\nu_6 = 46.83$ |
| $r_{10} = -77.685$ | | |
| $d_{10} = 2.8$ | | |
| $r_{11} = -18.935$ | | |
| $d_{11} = 1$ | $n_7 = 1.66259$ | $\nu_7 = 61.89$ |
| $r_{12} = 27.100$ | | |
| $d_{12} = 3$ | $n_8 = 1.83481$ | $\nu_8 = 36.61$ |
| $r_{13} = -45.231$ | | |
| $d_{13} = l_{21}$ | $(6.82 \sim 1.522 \sim 0.25)$ | |
| $r_{14} = \infty$ (stop) | | |
| $d_{14} = l_{22}$ | $(10.418 \sim 7.707 \sim 0.6)$ | |
| $r_{15} = 28.716$ | | |
| $d_{15} = 5.14$ | $n_9 = 1.48749$ | $\nu_9 = 70.15$ |
| $r_{16} = -161.540$ | | |
| $d_{16} = 2.3$ | | |
| $r_{17} = 558.626$ | | |
| $d_{17} = 3.3$ | $n_{10} = 1.56873$ | $\nu_{10} = 68.78$ |
| $r_{18} = -64.622$ | | |
| $d_{18} = 0.11$ | | |
| $r_{19} = 92.049$ | | |
| $d_{19} = 3$ | $n_{11} = 1.63306$ | $\nu_{11} = 63.26$ |
| $r_{20} = -137.918$ | | |
| $d_{20} = 4.25$ | | |
| $r_{21} = -24.097$ | | |
| $d_{21} = 2$ | $n_{12} = 1.82889$ | $\nu_{12} = 20.34$ |
| $r_{22} = -42.366$ | | |
| $d_{22} = 0.2$ | | |
| $r_{23} = 100.979$ | | |
| $d_{23} = 8.16$ | $n_{13} = 1.83641$ | $\nu_{13} = 31.52$ |
| $r_{24} = 30.921$ | | |
| $d_{24} = 3.47$ | | |
| $r_{25} = 345.629$ | | |
| $d_{25} = 4$ | $n_{14} = 1.62026$ | $\nu_{14} = 59.37$ |
| $r_{26} = -56.495$ | | |
| $d_{26} = 0.1$ | | |
| $r_{27} = 63.594$ | | |
| $d_{27} = 5.08$ | $n_{15} = 1.56873$ | $\nu_{15} = 57.74$ |
| $r_{28} = -291.508$ | | |

$f = 36.22 \sim 101.307$, F 4.1
$f_1 = 80.018$, $f_1/f_W = 2.209$
$f_2 = -20.157$, $f_2/f_W = -0.557$
$f_3 = 35.169$, $f_3/f_W = 0.971$
$\beta_2 W = -0.3876$, $\beta_2 S = -0.5436$, $\beta_2 T = -0.7752$
$\beta_3 W = -1.1678$, $\beta_3 S = -1.3929$, $\beta_3 T = -1.6339$
$1/\beta_2 W - 1/\beta_2 T = -1.29$, $\beta_2 T/\beta_2 W = 2$
$1/\beta_3 T - 1/\beta_3 W = 0.244$, $\beta_3 T/\beta_3 W = 1.399$
$r_{24}/f_3 = 0.896$, $(d_{21} + d_{23})/f_3 = 0.295$ wherein reference symbols $r_1$ through $r_{28}$ respectively represent radii of curvature of respective lens surfaces, reference symbols $d_1$ through $d_{27}$ respectively represent thicknesses of respective lenses and airspaces between respective lenses, reference symbols $n_1$ through $n_{15}$ respectively represent refractive indices of respective lenses, reference symbols $\nu_1$ through $\nu_{15}$ respectively represent Abbe's numbers of respective lenses, and reference symbols $\beta_2 S$ and $\beta_3 S$ respectively represent magnifications of the second and third lens groups in the standard position.

8. A zoom lens system according to claim 5, wherein said first lens group comprises a cemented doublet and a positive meniscus lens, said second lens group comprises a negative meniscus lens and two cemented doublets, and said third lens group comprises three positive lenses, a negative meniscus lens arranged to be concave toward the object side, a negative meniscus lens arranged to be convex toward the object side, and two positive lenses, said zoom lens system having the following numerical data:

| | | |
|---|---|---|
| $r_1 = 148.501$ | | |
| $d_1 = 2.5$ | $n_1 = 1.80518$ | $\nu_1 = 25.43$ |
| $r_2 = 58.233$ | | |
| $d_2 = 9$ | $n_2 = 1.51633$ | $\nu_2 = 64.15$ |
| $r_3 = -106.930$ | | |
| $d_3 = 0.1$ | | |
| $r_4 = 31.261$ | | |
| $d_4 = 5.2$ | $n_3 = 1.72916$ | $\nu_3 = 54.68$ |
| $r_5 = 56.152$ | | |
| $d_5 = l_1$ | $(0.55 \sim 10.49 \sim 16.62)$ | |
| $r_6 = 53.077$ | | |
| $d_6 = 1.5$ | $n_4 = 1.7725$ | $\nu_4 = 49.66$ |
| $r_7 = 15.712$ | | |
| $d_7 = 3.2$ | | |
| $r_8 = 139.937$ | | |
| $d_8 = 3.4$ | $n_5 = 1.60342$ | $\nu_5 = 38.01$ |
| $r_9 = -29.521$ | | |
| $d_9 = 1$ | $n_6 = 1.804$ | $\nu_6 = 46.57$ |
| $r_{10} = 207.838$ | | |
| $d_{10} = 2.8$ | | |
| $r_{11} = -18.409$ | | |
| $d_{11} = 1$ | $n_7 = 1.66687$ | $\nu_7 = 57.33$ |
| $r_{12} = 28.284$ | | |
| $d_{12} = 3.2$ | $n_8 = 1.834$ | $\nu_8 = 37.16$ |
| $r_{13} = -54.062$ | | |
| $d_{13} = l_{21}$ | $(7.4 \sim 1.402 \sim 0.274)$ | |
| $r_{14} = \infty$ (stop) | | |
| $d_{14} = l_{22}$ | $(10.42 \sim 7 \sim 0.4)$ | |
| $r_{15} = 31.123$ | | |
| $d_{15} = 5.14$ | $n_9 = 1.48749$ | $\nu_9 = 70.15$ |
| $r_{16} = -76.631$ | | |
| $d_{16} = 2.02$ | | |
| $r_{17} = 1490.2$ | | |
| $d_{17} = 3.3$ | $n_{10} = 1.48749$ | $\nu_{10} = 70.15$ |
| $r_{18} = -60.161$ | | |
| $d_{18} = 0.1$ | | |
| $r_{19} = 109.458$ | | |
| $d_{19} = 3$ | $n_{11} = 1.617$ | $\nu_{11} = 62.79$ |

-continued

| | | |
|---|---|---|
| $r_{20} = -140.632$ | | |
| $d_{20} = 4.25$ | | |
| $r_{21} = -22.961$ | | |
| $d_{21} = 2$ | $n_{12} = 1.84666$ | $\nu_{12} = 23.88$ |
| $r_{22} = -35.748$ | | |
| $d_{22} = 0.2$ | | |
| $r_{23} = 67.841$ | | |
| $d_{23} = 8.15$ | $n_{13} = 1.80518$ | $\nu_{13} = 25.43$ |
| $r_{24} = 30.118$ | | |
| $d_{24} = 3.47$ | | |
| $r_{25} = -1582.82$ | | |
| $d_{25} = 4$ | $n_{14} = 1.61941$ | $\nu_{14} = 60.27$ |
| $r_{26} = -43.736$ | | |
| $d_{26} = 0.11$ | | |
| $r_{27} = 45.619$ | | |
| $d_{27} = 5.08$ | $n_{15} = 1.56101$ | $\nu_{15} = 58.63$ |
| $r_{28} = 108.887$ | | |

$f = 36.22 \sim 101.35$, F 4.1
$f_1 = 60.207$, $f_1/f_W = 1.662$
$f_2 = -17.331$, $f_2/f_W = -0.478$
$f_3 = 32.637$, $f_3/f_W = 0.901$
$\beta_2W = -0.5204$, $\beta_2S = -0.7419$, $\beta_2T = -1.0057$
$\beta_3W = -1.156$, $\beta_3S = -1.440$, $\beta_3T = -1.674$
$1/\beta_2W - 1/\beta_2T = -0.927$, $\beta_2T/\beta_2W = 1.933$
$1/\beta_3T - 1/\beta_3W = 0.268$, $\beta_3T/\beta_3W = 1.448$
$r_{24}/f_3 = 0.923$, $(d_{21} + d_{23})/f_3 = 0.31$ wherein reference symbols $r_1$ through $r_{28}$ respectively represent radii of curvature of respective lens surfaces, reference symbols $d_1$ through $d_{27}$ respectively represent thicknesses of respective lenses and airspaces between respective lenses, reference symbols $n_1$ through $n_{15}$ respectively represent refractive indices of respective lenses, reference symbols $\nu_1$ through $\nu_{15}$ respectively represent Abbe's numbers of respective lenses, and reference symbols $\beta_2S$ and $\beta_3S$ respectively represent magnifications of the second and third lens groups in the standard position.

* * * * *